(12) United States Patent
Johnson et al.

(10) Patent No.: US 7,072,081 B2
(45) Date of Patent: Jul. 4, 2006

(54) COMPACT PORTABLE 2D/ 3D IMAGE CAPTURE SYSTEM

(75) Inventors: Dan S. Johnson, Milliken, CO (US); Shaz Naqvi, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 998 days.

(21) Appl. No.: 09/999,789

(22) Filed: Oct. 24, 2001

(65) Prior Publication Data

US 2003/0076546 A1   Apr. 24, 2003

(51) Int. Cl.
   *H04N 1/04* (2006.01)
   *H04N 7/18* (2006.01)

(52) U.S. Cl. ............... 358/474; 358/496; 358/497; 348/156; 348/158

(58) Field of Classification Search ........... 358/474, 358/296, 297, 496, 497; 348/156, 158
See application file for complete search history.

(56) References Cited

U.S. PATENT DOCUMENTS 3,997,723 A * 12/1976 Sandin .................. 348/343
5,635,981 A *  6/1997 Ribacoff ................ 348/156

* cited by examiner

*Primary Examiner*—David Moore
*Assistant Examiner*—Houshang Safaipour

(57) ABSTRACT

The present invention provides a compact, portable system for capturing two dimensional images from printed and related media, as well as three dimensional scenic images, such as photographs, combining the optical features of scanning and photography. A compact, portable image capturing system is provided that is relatively simple and inexpensive, which is easy to operate, rugged, reliable, integrating the navigational and text-gathering functionalities seamlessly, transparently, and reliably, and not prone to optical misalignment, or cessation of scanning and loss of information, obviating much of the repetition of scanning efforts required by the conventional art. The present invention provides a compact, portable system for capturing both two dimensional images from printed and related media, and three dimensional scenic images, such as photographs, while providing constant user feedback of the image quality and effectiveness, during the imaging process.

18 Claims, 11 Drawing Sheets

COMPACT PORTABLE 2D/ 3D IMAGE CAPTURE SYSTEM

BACKGROUND OF THE INVENTION

1. Field of the Invention

The present invention relates to the field of image capture. Specifically, the present invention relates to a compact portable apparatus and system for scanning and correspondingly capturing images electronically.

2. Related Art

Modern portable image capturing devices enable users to capture information, such as lines or pages of printed text, snapshot photographs, or video, in an electronic form. Information contained in printed media may be captured electronically by scanning type image capture devices. These portably mimic the functionality of larger, more cumbersome desk-top type or other scanner designs, built for office like environments. Scenic information, on the other hand, may be captured electronically by portable digital cameras and/or video recording cameras. At the heart of such image capturing systems is the charged-coupled device (CCD), or smaller, less expensive variants, such as the contact image sensor (CIS).

Printed information is captured by scanning lines of text with the image capturing device and storing the information within the device, or in an auxiliary storage mechanism, such as a flash memory device, for later retrieval by the user. Retrieval may be by viewing the information directly on a display integral to the image capturing device. Portable digital cameras generally record scenic information in formats such as graphics interchange format (GIF) and Joint Photographic Expert Group (JPEG) electronic files. Video cameras generally record in a video format such as digital television (DTV) and Joint Motion Picture Expert Group (MPEG) digital files, and National Television Standards Committee (NTSC) analog signals.

In an image capturing device with instant, local retrieval capability, some on-board image processing and display faculty, effective for allowing exhibition, is required. Alternatively, the stored information may be downloaded to another device for display thereon. For example, the image capturing device may be coupled by a universal serial bus (USB) connector or other suitable wire based and/or wireless interconnection modality to a personal computer (PC), notebook computer, or personal digital assistant (PDA). The stored information may then be downloaded thereto, processed, and displayed accordingly.

Conventional portable image capturing devices for printed media are typified by two main configurations, at opposite extremes of complexity. At the simple end are inexpensive line-of-text scanners, some appearing similar to a somewhat oversized pen or highlighter type writing implement. Line-of-text scanners are very simple devices of relatively low capability. They are utilized by running an optical acquisition portal over a line of text to be captured. They typically capture a line or a few lines of text. However, the captured textual line snippets captured therein may not easily be stitched back together. Thus their application for all but the most rudimentary scanning tasks is quite limited.

At the opposite end are a genus of rather complex, more capable conventional portable scanning systems, capable of significantly more complicated scanning tasks. Thus, they are substantially more useful. For example, conventional portable scanners may be used to capture whole pages of text. In as much as their portability demands a small size to ensure ease of handling and use, conventional portable scanner systems are typically smaller than the pages of most common books or document sizes; on the order of three by six inches (3"×6").

To effectively scan a full sized document pages therefore, such as an 8½"×11", 8½"×14", A4, etc., and/or various book sizes, such as 4⅞"×7 5/16", 5¾"×8⅞", etc., the optical acquisition portal of the portable scanner system is passed over the pages, individually, in a number of swath passes, until the entire page, or as much of the text thereon as is desired, is covered by the scanning. The portable scanning system incorporates an on-board capability to stitch the individually scanned swaths of text together into an electronic format duplicating their on-page layout.

Typically, the capability to stitch together the individually scanned textual swaths is effectuated by a separate on-board navigational system. In fact, some conventional navigational systems apply two separate optical scanning systems that take very rapid snapshots of the page being scanned. These actually track the grid-like layout of paper fibers constituting the physical makeup of the page. This functionality is simultaneous with a separate, third, ink-based textual optical scan and recordation functionality. The dual navigational scan system scans and records the resulting on-page fiber grid geography mnemonically, and implements an algorithm correlating the information from the two navigational scans into a positional reference. Further, the dual navigational scan system implements an algorithm correlating the textual information captured by the separate text scan with the positional reference. In this manner, conventional portable scanners attempt to effectuate a stitch-together reconstruction of the macro-layout of the text.

In a number of areas, the conventional art is problematic. One problem is that conventional portable scanners are fairly complex systems for their size and intended application. Like other systems of undesirably high complexity, conventional portable scanners are somewhat expensive and prone to failures. For example, the conventional portable scanners have the three separate scanning features discussed above; two of them navigational and one textual. Obviously, this tripling of scanning requirements increases cost. In fact, the conventional navigational scan system, concentrating as it does on the fiber grid constituting the physical page construction, is not naturally in simpatico with the ink-based text capturing scan system, and vice versa.

Designing the text stitch-together functionality around these scan system disharmonies increases its own costs, also. Not only must both navigational systems be in perfect synchronism and alignment with each other, but the third text gathering scanning system must also be perfectly synchronized and aligned with both navigational systems. This need for calibrated, precision alignment increases manufacturing costs, especially those due to quality assurance and calibration. Correspondingly higher unit prices reflect this.

Another difficulty with the conventional art is inherent in the navigational system itself. When contact-requiring portable scanners lose contact with the page being scanned, such as due to tilting or lifting from the page surface, or if they run off the end of the page, information is lost. The entire scan in progress when contact is broken must be repeated, because the navigational system loses positional reference with which the text was to be stitched together. To users struggling to gather information in the portable milieu, which may often be far less comfortable, safe, and/or relaxed than desirable, this is wasteful, time-consuming, repetitive, and costly.

Further, this precision alignment is especially vulnerable to becoming misaligned in these portable systems, owing to the relatively rugged attributes accompanying portability itself, as well as to the manner in which the portable scanners are used. Movement and mechanical shock and vibration are common attributes of the operational milieu of portable systems in general. These tend to missallign precision optics such as the three separate scan systems of conventional portable scanners. Further still, the physical design and manner of use of conventional portable scanning systems exacerbates this problem.

Focal lengths and other optical parameters of conventional portable scanners, as well as application of CIS devices in lieu of CCDs therein requires, first, that such devices be used with an optical portal in contact with the page being scanned. Environmental conditions, such as curvature of the pages of a book being scanned, irregularities in the surface upon which a document is laid for scanning, and conditions related to movement, such as vibration, pitch, yaw, and roll, acceleration and jerkiness may interfere with or preclude this requirement for scanning surface flatness. The first of these factors is, of course, shared in common with stationary scanners. The rest of the factors, however, are unique to portable scanners.

Some conventional portable scanners are somewhat long and correspondingly top-heavy to achieve their requisite focal lengths. This is cumbersome and awkward, and tends to amplify the negative effects of surface and movement on the scanning process. Top-heavy portable scanners are difficult to control in some applications, and especially to keep in contact with the page being scanned.

One problem of the conventional art may aggravate the problems of loss of information. The user may not be aware that optical contact was broken, terminating a particular scan swath and requiring its repetition. This can be especially vexing, requiring repetition of the entire scan from start to finish, if it goes undetected until the end of a scan effort.

Another problem is that existing systems have limited format capabilities. Conventional portable scanners only posses contact image gathering capability; they do not take photographs of real world images. Conversely, digital cameras, while they may photograph a page of text like any other object, are not optimized for gathering textual information. Users of both devices encounter situations wherein both types of information must be captured. For example, an architect or a construction engineer may employ a portable scanner to gather the information contained in a job-site specification, and a digital camera to photograph scenes of construction in progress (or videotape construction activity) at the job site. For each information gathering task, the user must have one of each type of conventional image capturing devices at hand. This is cumbersome, duplicative, wasteful, and costly.

However, combining both functions into a single device has been conventionally impractical, because the optical systems required for each separate function are inapposite to those required for the other. Cameras (still and video) usually require optical systems that either focus over a range from close-in to infinity, or have a fixed focus of near infinity. Their ability to capture textual images and data are limited by optical distortions, including barrel distortion, limited or lacking illumination and difficulties in illuminary control, and depth of focus constraints. Portable scanners, on the other hand, require the essentially point-blank optical contact discussed above.

What is needed is a compact, portable system for capturing both two dimensional and three dimensional images from printed and related media. What is also needed is a compact, portable system for capturing both two dimensional and three dimensional images from printed and related media, as well as scenic images, such as photographs and/or video, combining the optical features of scanning and photography. Further, what is needed is such a system that is relatively simple and inexpensive, and which is easy to operate, rugged, reliable, and not unduly prone to optical misalignment, or cessation of scanning with loss of information, requiring repetition of scanning efforts. Further still, what is needed is a compact, portable system for capturing both two dimensional and three dimensional images from printed and related media, as well as scenic images, such as photographs and/or video, and which provides constant user feedback of the scan quality and effectiveness, during the scan process. Yet further still, what is needed is a system that accomplishes the foregoing and integrates the navigational and text-gathering functionalities seamlessly, transparently, and reliably.

SUMMARY OF THE INVENTION

The present invention effectuates an apparatus and method for capturing two dimensional images, scanned by a first optical interface, and three dimensional images, collected by a second optical interface. The captured images are sensed by an image sensor, which is optically coupled to the first and second optical interfaces. The image sensor generates a signal corresponding to graphical information constituting the two dimensional scanned images and the three dimensional collected images. The apparatus may be compact and portable. It may effectuate export of the image sensor signal, and/or process the signal on-board by an image processing system. Effectively, the present invention combines the functionality of portable scanners and of digital cameras and video camcorders.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

The present invention is discussed primarily in the context of a system for capturing two-dimensional (2D) and three-dimensional (3D) images, converting the images to an electronic format, storing and transferring the images. With respect to capturing 2D images, one embodiment of the present invention functions effectively as a portable scanner. With respect to capturing 3D images, one embodiment of the present invention functions effectively as a digital camera, and in another embodiment, as a digital video camera/recorder (e.g., camcorder).

Exemplary Compact Portable 2D/3D Image Capture Systems

Exemplary Basic Scanning Image Capturing Apparatus

In one embodiment of the present invention, an image capture apparatus (ICS) 100 functions both as a compact, portable scanner to capture 2D images and as a digital camera to capture 3D images. In another embodiment, apparatus 100 functions to capture 3D images as a camcorder. Apparatus 100 applies a single area image sensor 102 to effectuate both the imaging and navigation functions required for scanning.

Figure 1:
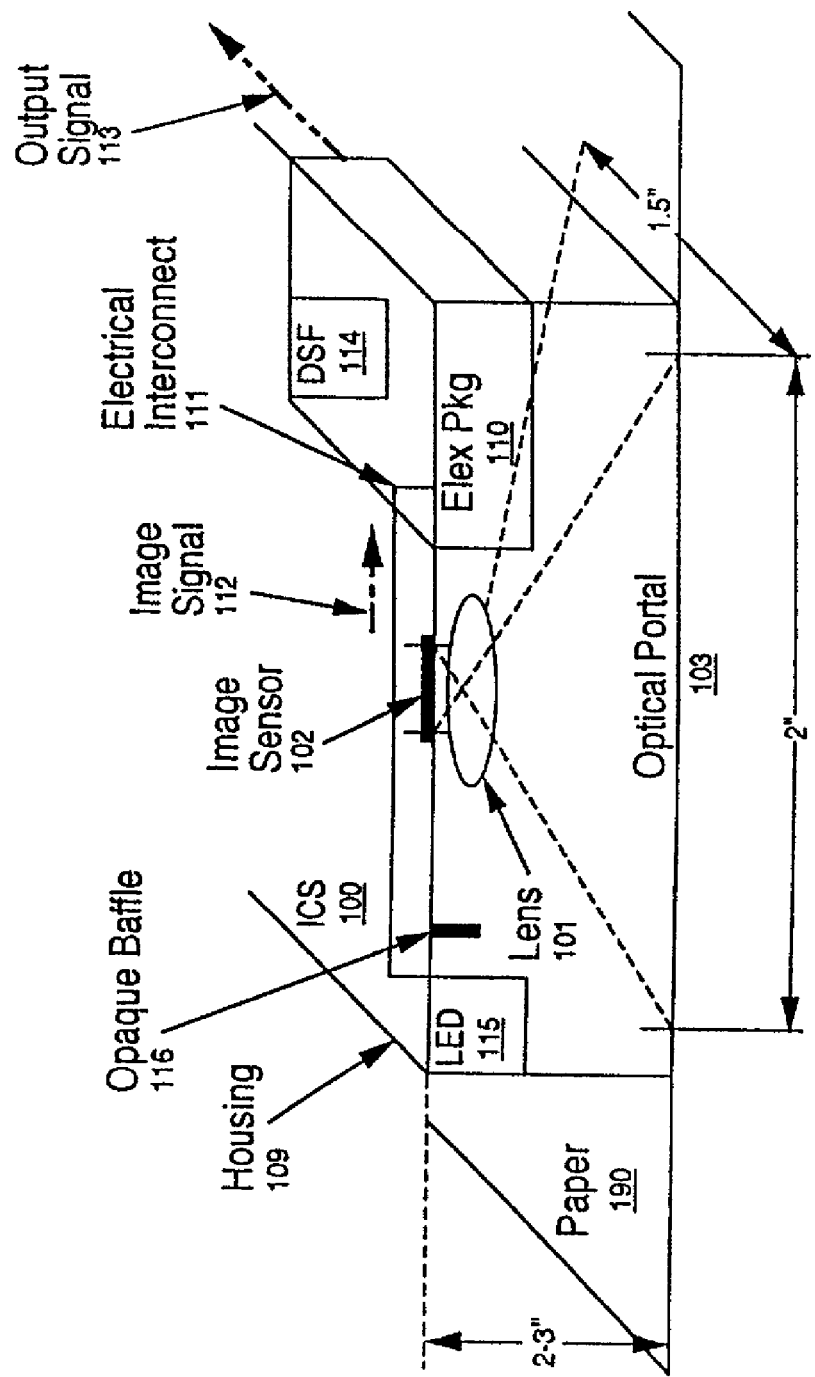
FIG. 1 is a diagram depicting a simple optical system employing a single sensor for both image capturing and navigation, in accordance with one embodiment of the present invention.

With reference to FIG. 1, one such image capturing system 100 is discussed. In one embodiment, image sensor 102 is a simple color video graphic array (VGA) complimentary metal oxide semiconductor (CMOS) optical detector. Image sensor 102, like other VGA sensors, has 640×480 pixels, corresponding to imaging an area of optical portal 103 equivalent to two (2) inches by one and one half (1.5) inches (2"×1.5") and yielding approximately 300 dots per inch (dpi), after demosaicing. Image sensor 102, in other embodiments, may be effectuated by application of charge-coupled devices, contact image sensors, and/or optically sensitive solid state devices.

Image sensor 102 converts light impinging its surface from an image on paper 190, focused by lens 101, into a corresponding electrical signal 112. Image sensor 102 is electrically coupled, in one embodiment, to an on-board electronics package 110 by electrical interconnect 111. Electronics package 110 is housed within a housing 109, which also securely encloses the rest of image capturing system 100 in its entirety. Electronics package 110 contains circuits to condition the signal 112 from image sensor 102 corresponding to the image on paper 190, process the signal 112, and prepare a corresponding output signal 113. Electronics package 110 may also provide on-board power, charging, electrical interconnection (e.g., for signal export), electrical (including thermal) protection, porting, and indication for image capturing system 100. It may also power and control a display (e.g., displays 401, 401.1, 401.2; FIGS. 4A, 4B, 4C and 5, respectively).

In one embodiment, illumination for the image to be scanned on paper 190 is provided by light emitting diode (LED) 115. In another embodiment, another device provides illumination. Illumination from LED 115 (or other on-board illuminary source) is shielded from image sensor 102, by opaque baffle 116. Advantageously, opaque baffle 116 prevents interference and/or noise effects from image sensor 102 due to direct impingement of light thereon from LED 115, ensuring that the only light to which image sensor 102 will respond is reflected from the surface of paper 190 under optical portal 103, illuminated by LED 115, through lens 101. In one embodiment, LED 115 receives power and illumination execution enabling signals from electronics package 110, also via electrical interconnect 111.

In one embodiment, electronics package 110 is constituted by relatively simple circuits, such that output signal 113 is materially not changed significantly from image signal 112. In this embodiment, image capturing system 100 is a simple, relatively less intelligent system. In such a system, output signal 113 is simply exported to an external modality for further processing, storage, and application. Such external processing modalities may include computers, such as desktop style personal computers (PC) and workstations, notebook style computers, and/or personal digital assistants (PDA), and other graphics, electronic publishing, and processing functionalities.

Figure 6:
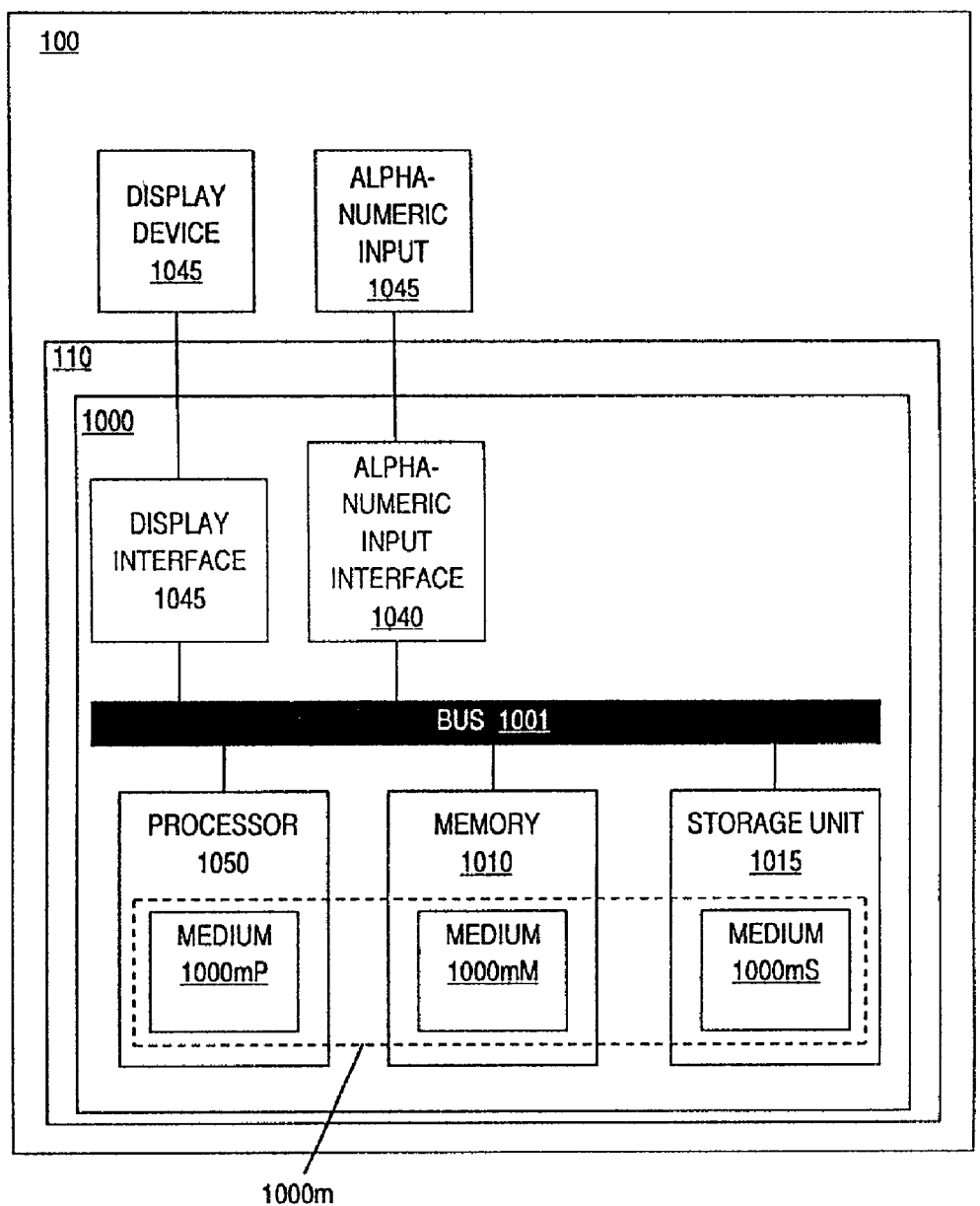
FIG. 6 is a diagram of an on-board computer system effectuating image processing, memory, and transport, in accordance with one embodiment of the present invention.

In one embodiment, electronics package 110 contains or accommodates a data storage facility (DSF) 114, such as an on-board memory such as random access memory (RAM), or a removable memory. Removable memory may include data storage media such as flash memory, memory cards, memory sticks, diskettes, or any other medium with mnemonic functionality. In the present embodiment, output signal 113 is written to DSF 114. Electronics package 110 may also accommodate a data processing system (e.g., computer system 1000; FIG. 6).

In one embodiment, electronics package 110 accommodates a more complex and capable on-board processing modality. In the present embodiment, image capturing system 100 is a significantly more intelligent electronic system with greatly enhanced processing capabilities. In one embodiment, image capturing system 100 accommodates a computer sub-system (e.g., computer system 600; FIG. 6) within electronics package 110. In the present embodiment, DSF 114 may be incorporated within, or associated with computer system 600 (FIG. 6).

In one embodiment, image capturing system 100, to effectuate an optical conjugate length sufficient for a quality image product, corresponding to reproduction via output signal 113, is relatively tall. The height of image capturing system 100, in the present embodiment, is on the order of two to three inches (2"–3"). The present embodiment incorporates features, such as designed-in counterweighting by component placement, to eliminate problems encountered in conventional portable scanners, such as tilting.

In one embodiment, image capturing system 100, to effectuate an optical conjugate length sufficient for a quality image product, corresponding to reproduction via output signal 113, is utilized in a position above, rather than in direct contact with, paper 190. The present embodiment incorporates features, such as designed-in usage simplification, to counter complications in the user model corresponding to operating above paper 190. Further, the present embodiment employs a feature to adjust the image signal 112 output of image sensor 102 to correspondingly counter uncontrolled illuminary effects associated with operation out of contact with paper 190.

One such feature of one embodiment is a simple photoelectric adjustment circuit incorporated into electronics package 110. Other circuits incorporated into electronics package 110 may effectuate this feature in another embodiment. Similarly, magnification variations corresponding to changes in the positioning of optical portal 103 above paper 190, such as by unsteady or wavering user holding, are electronically compensated for by sensing and adjusting circuits incorporated into electronics package 110.

In one embodiment, image capturing system 100, to effectuate an optical conjugate length sufficient for a quality image product, corresponding to reproduction via output signal 113, yet without increasing the physical height of image capture system 100, the VGA capability is applied to a smaller image. In this embodiment, the 640×480 pixels image an area covered by an optical portal 103 of approximately one inch by three quarters of an inch (1"×0.75"). The reduced image area requires, in this embodiment, a greater number of swath passes to scan an area equivalent to the previously discussed embodiments. However, the present embodiment, advantageously, has a smaller height aspect, on the order of one inch to one and a half inches (1"–1.5"), requiring less designed-in balancing.

Exemplary Articulated Scanning Image Capturing System

Figure 2:
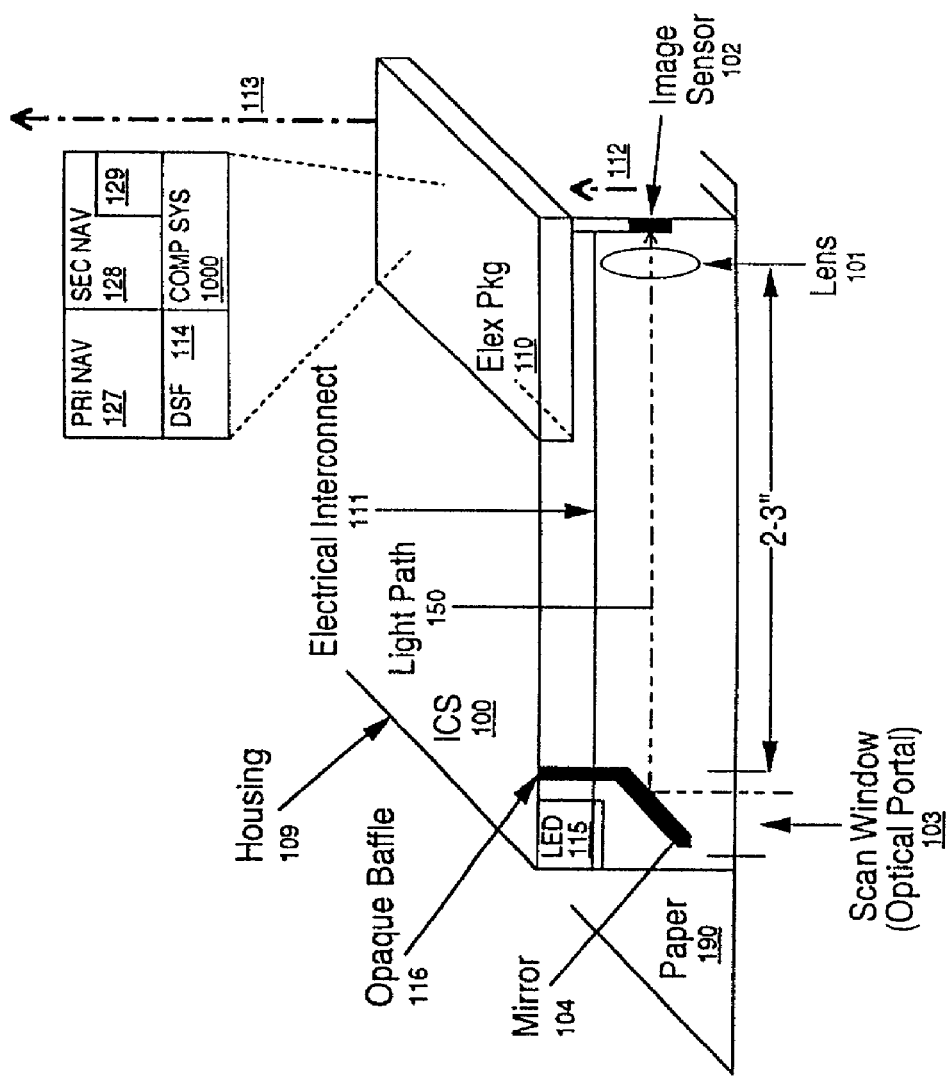
FIG. 2 is a diagram depicting an improved optical system housed with a relatively low aspect and center of gravity, in accordance with one embodiment of the present invention.

In one embodiment, the present invention provides a scanning apparatus with an articulated optical path. One such embodiment is depicted in FIG. 2. Advantageously, this effectuates a portable scanner with an optical conjugate length sufficient for high quality imaging capability, yet presenting a very small height aspect, and virtually eliminating any requirement for height-related designed-in balancing and/or scanning out-of-contact with paper 190.

In the present embodiment, image capturing system 100 is ensconced, in its entirety, within a protective structural housing 109. In the present embodiment, a functionality such as a viewing window or an on-board real-time scanning display (e.g., displays 401, 401.1, 401.2; FIGS. 4A, 4B, 4C and 5, respectively) informs a user where the scan line on paper 190 physically lies.

Importantly, by inserting mirror 104 into the path of light 150 reflected from the surface of paper 190, through optical portal 103, the optical pathway is articulated at effectively a right angle, toward lens 101 and image sensor 102. Advantageously, a reasonable optical conjugate length for a superior representative image of what is being scanned is achieved with a much smaller height aspect. The height of the present articulated embodiment, for scanning the 1.5 inch scan length corresponding to a full 480 pixel VGA aspect, is approximately 1.5 inches. In one embodiment, mirror 104 is a first-surface mirror. In one embodiment, mirror 104 is highly reflective at visible wavelengths.

In one embodiment, the image capture system 100 utilizes only a portion of image sensor 102. In one embodiment, a 640×80 pixel slice of image sensor 102 is utilized, with a corresponding height aspect for image capture system 100 on the order of a mere 0.25 inches of height aspect required for the height component of the articulated optical path 150. This height does not take into account whatever minimal additional height is required for case parts of housing 109, a display (e.g., displays 401, 401.1, 401.2; FIGS. 4A, 4B, 4C and 5, respectively), electronics package 110, etc. Advantageously, limiting the slice of image sensor 102 utilized in the present embodiment reduces computational bandwidth requirements, and requires less illumination, with correspondingly lower illuminary power consumption.

Further, the thinness proffered in the present embodiment by the substantially reduced physical height aspect required to achieve enabling optical conjugate effectuates utility of image capturing system 100 as a snap-on or similarly convenient attachment for a more capable hand-held device, such as a PDA. This effectuates production of low-cost image capture systems of relatively low built-in (e.g., on-board) capability, yet extremely high image processing potential, when utilized in combination with a PDA or similar device with high computational capacity.

In the present embodiment, articulation of the optical path 150 effectuates image capture system 100 functional componenting correspondingly similar to embodiments discussed above, yet with a shorter structure. In one embodiment, image sensor 102 is a simple color VGA complimentary metal CMOS optical detector. In one embodiment, image sensor 102 has a full VGA complement of 640×480 pixels, corresponding to imaging an area of optical portal 103 equivalent to two (2) inches by one and one half (1.5) inches (2"×1.5") and yielding approximately 300 dots per inch (dpi), after demosaicing.

Image sensor 102 converts light impinging its surface from an image on paper 190, focused by lens 101, into a corresponding electrical signal 112. Image sensor 102 is electrically coupled, in one embodiment, to an on-board electronics package 110 by electrical interconnect 111. Electronics package 110 is housed within a housing 109. Electronics package 110 contains circuits to condition the signal 112 from image sensor 102 corresponding to the image on paper 190, process the signal 112, and prepare a corresponding output signal 113. Electronics package 110 may also provide on-board power, charging, electrical interconnection (e.g., for signal export), electrical (including thermal) protection, porting, and indication for image capturing system 100. It may also power and control a display (e.g., displays 401, 401.1, 401.2; FIGS. 4A, 4B, 4C and 5, respectively).

In one embodiment, illumination for the image to be scanned on paper 190 is provided by light emitting diode (LED) 115. In another embodiment, another device provides illumination. Illumination from LED 115 (or other on-board illuminary source) is shielded from image sensor 102, by opaque baffle 116. Advantageously, opaque baffle 116 prevents interference and/or noise effects from image sensor 102 due to direct impingement of light thereon from LED 115, ensuring that the only light to which image sensor 102 will respond is reflected from the surface of paper 190 under optical portal 103, illuminated by LED 115, through lens 101. In one embodiment, LED 115 receives power and illumination execution enabling signals from electronics package 110, also via electrical interconnect 111.

In one embodiment, electronics package 110 is constituted by relatively simple circuits, such that output signal 113 is materially not changed significantly from image signal 112. In this embodiment, image capturing system 100 is a simple, relatively less intelligent system. In such a system, output signal 113 is simply exported to an external modality for further processing, storage, and application. Such external processing modalities may include computers, such as desktop style PCs and workstations, notebook computers, and/or PDAs, and other graphics, electronic publishing, and processing functionalities.

In one embodiment, electronics package 110 contains or accommodates a DSF 114, such as an on-board memory such as RAM, or a removable memory. Removable memory may include data storage media such as flash memory, memory cards or sticks, diskettes, or any other mnemonic functional medium. In the present embodiment, output signal 113 is written to DSF 114.

In one embodiment, electronics package 110 accommodates a more complex and capable on-board processing modality. In the present embodiment, image capturing system 100 is a significantly more intelligent electronic system with greatly enhanced processing capabilities. In one embodiment, image capturing system 100 accommodates a computer sub-system (e.g., computer system 600; FIG. 6) within electronics package 110. In the present embodiment, DSF 114 may be incorporated within, or associated with computer system 600 (FIG. 6).

In one embodiment, electronics package 110 incorporates a navigational system 127 that navigates the scan, effectuating seamless textual stitch-togethers of any number of scan swaths. The navigational system 127, in the present embodiment, works by guiding off of the printed text, itself, rather than the paper fiber grid, characteristic of the conventional art. Thus, the navigational scanning is seamless, and scanning is not interrupted by "running out of page," loss of contact with the page, or tilting, and other problems common in the conventional art. In one embodiment, a robust, very short focal length optical interface effectuates on-page scanning, while a second, overlapping optical interface accomplishes the capture of scenic information photographically (or in video). The second optical interface, in one embodiment, has a fixed focus of near infinity. In another embodiment, the second optical interface may focus from very close to infinity.

The first optical interface, e.g., the 2D scanning system, optically supports the navigational function of electronics package 110. The text-based, e.g., ink based navigational system, is a primary navigational system, in one embodiment. The text-based, e.g., ink-based primary navigational system uses techniques well known in the art to affix positional beacons to parts of the text.

In one embodiment, the text-based, e.g., ink-based, primary navigational system 127 is backed up by a secondary navigational system 128, also supported by electronics package 110, and fully computationally integrated with the primary navigational system. In one embodiment, the secondary navigational system 128 utilizes an accelerometer array 129 to navigate by accelerometric reckoning, when the scanner is passing over a portion of page which contains no text. When text is reached again, the primary navigational system, with current positional information received from the secondary system, resumes navigation by affixing a positional beacon to the new text correlating to the positional information kept current by the secondary system. In one embodiment, another mechanical navigation device, such as mouse and/or track balls, may effectuate the secondary navigation.

In one embodiment, the primary and secondary navigational systems are mutually correcting. In one embodiment, the secondary navigational system is a paper-fiber grid-based system, such as the sole navigational systems of the conventional art. In one embodiment, primary navigational system 127 and secondary navigational system 128 are supported by, or contained within a data processing system (e.g., computer system 1000; FIG. 6), which, itself, may be contained within electronics package 110.

Exemplary Portable Scanner with Added 3D Imaging Capability

Figure 3A:
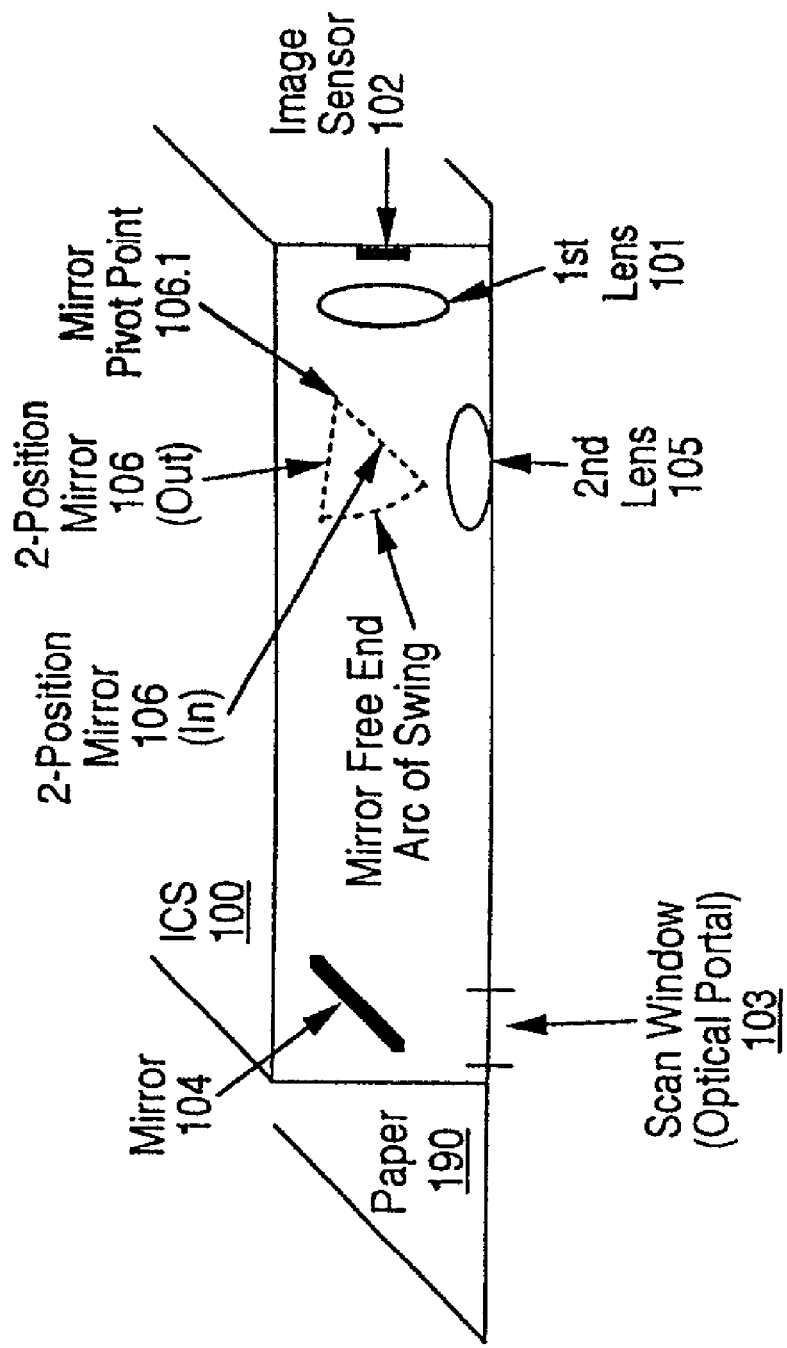
FIG. 3A is a diagram depicting a dual-train optical system, permitting capture of both textual and scenic information, in accordance with one embodiment of the present invention.

In one embodiment of the present invention, the capability of capturing three dimensional (3D) images, including scenes of near and/or distant reality, may be added to a portable scanner image capture system 100, such as the system discussed immediately above, which captures two dimensional (2D) images from printed media (e.g., paper 190). With reference to FIG. 3A, one such embodiment is depicted. In the following discussion, certain aspects of the present embodiment that are substantially identical or sufficiently similar to corresponding functional aspects of the embodiment discussed immediately above, have not been described in detail herein, so as not to unnecessarily obscure significant aspects of the present embodiment of the invention under discussion.

In one embodiment, a 2D/3D image capture system 100 incorporates a first optical interface (e.g., lens 101, optical portal 103, and mirror 104) substantially identical, in its 2D functionality, to the image capture system 100, depicted in FIG. 2 and discussed above. To effectuate a 3D image capturing capability, image capturing system 100, in the present embodiment, further incorporates a second optical interface, e.g., adding a second lens 105 and a second mirror 106. In one embodiment, one or more prisms provide the functionality represented in the figures with one or more of mirrors 104 and 106.

Figure 3B:
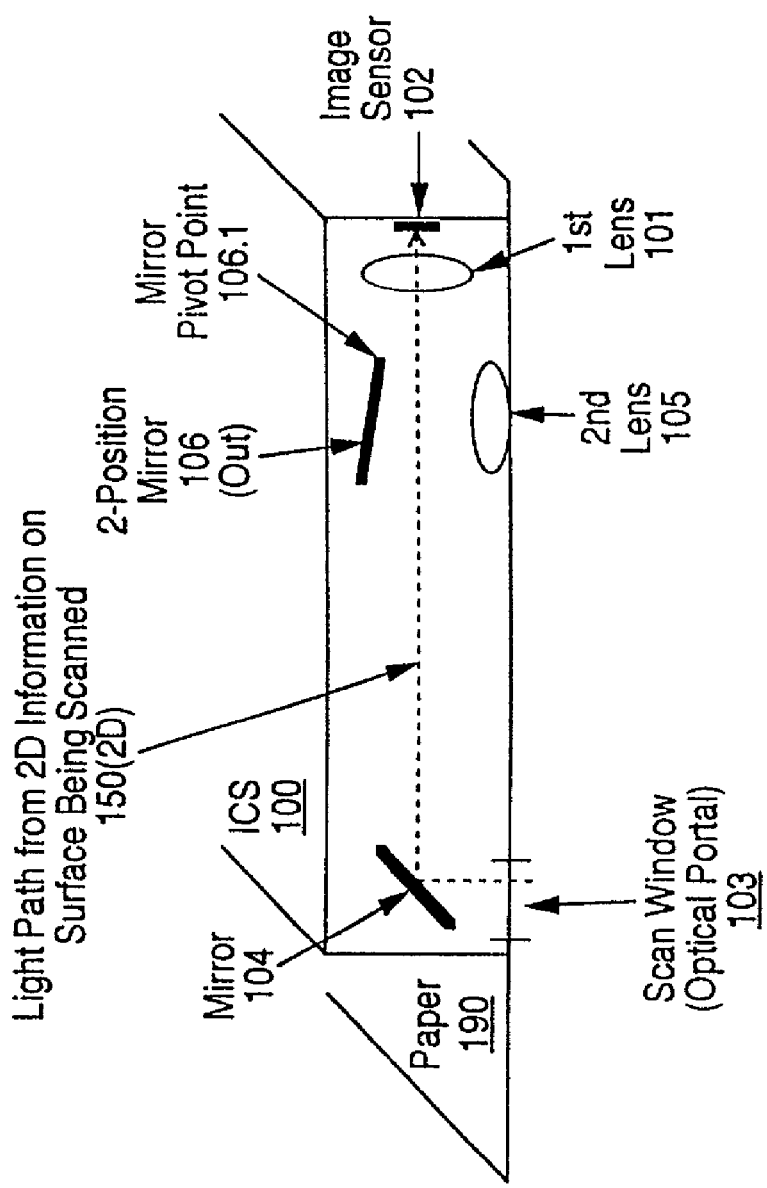
FIG. 3B is a diagram depicting a dual-train optical system, permitting capture of both textual and scenic information, aligned to capture textual information, in accordance with one embodiment of the present invention.

In one embodiment, mirror 106 is a dual-position mirror. In a first, "out" position, two-position mirror 106 is effectively held out of the first optical interface, e.g., allowing mirror 104 to optically couple through lens 101 to image sensor 102, enabling scanning to occur through the scan window, e.g., optical portal 103. As depicted in FIG. 3B, the first "out" position of two-position mirror 106 thus effectuates scanning of 2D images by allowing light reflected from 2D images on paper 190 to follow a transparent optical path (e.g., light path 150; FIG. 2) to reach lens 101, and subsequently, image sensor 102. In one embodiment, mirror 106 is a first-surface mirror. In one embodiment, mirror 106 is highly reflective at visible wavelengths. Two-position mirror 106 is mounted, and is held securely in its "out" position by any of a number of mechanical and/or electromechanical mechanisms well known in the art.

To capture 3D images, two-position mirror 106 pivots about mirror pivot point 106.1, and swings down into a second "in" position. Two-position mirror 106 is swung down, its free end scribing an arc of swing, and is placed securely and held in its "in" position by any of a number of mechanical and/or electromechanical mechanisms well known in the art. In this second "in" position, two-position mirror 106, effectively opaque from its rear, disrupts the first optical interface by preventing light reflected from mirror 104, from reaching lens 101, and thus, from reaching image sensor 102. However, two-position mirror 106, in its "in" position, effectively forms a second optical interface, e.g., optically couples an objective second lens 105 with first lens 101. Objective lens 105 "peers out" of image capture system 100.

Figure 3C:
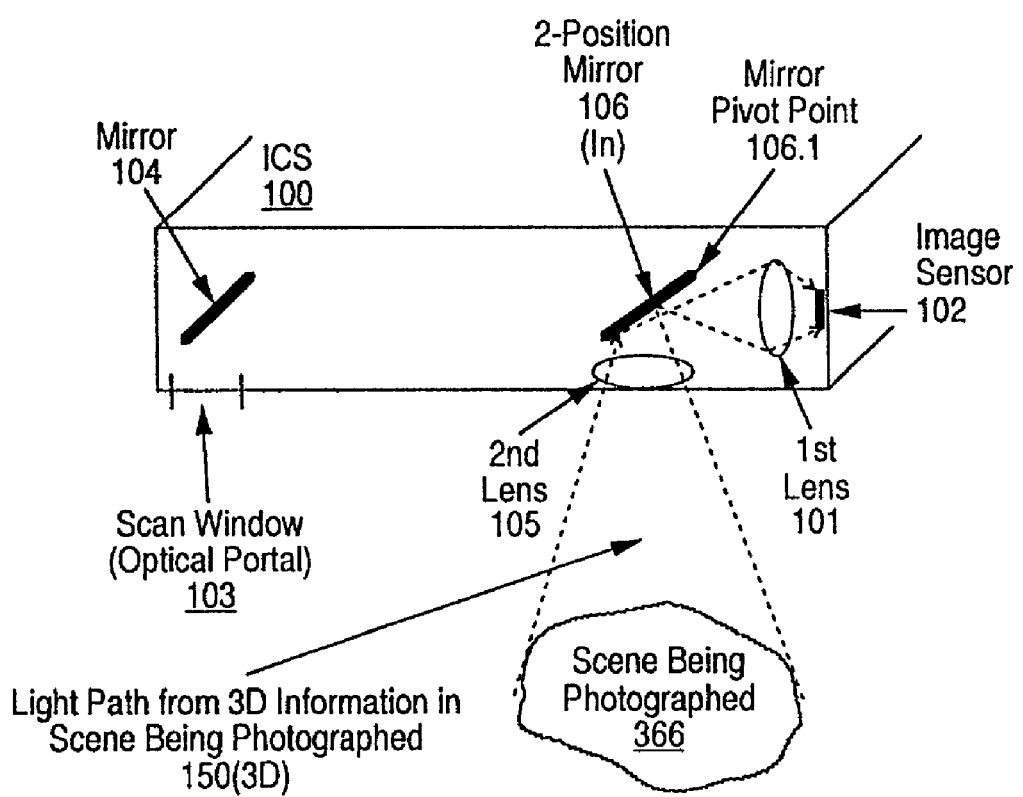
FIG. 3C is a diagram depicting a dual-train optical system, permitting capture of both textual and scenic information, aligned to capture scenic information, in accordance with one embodiment of the present invention.

Referring now to FIG. 3C, in the present configuration, with two-position mirror 106 deployed in its "in" position, light 150(3D), reflected from a scene 366 being photographed and/or videoed, is gathered by objective lens 105 is reflected from the front surface of two-position mirror 106 to first lens 101. Lens 101 focuses this light onto image sensor 102. Image sensor 102 generates a corresponding signal (e.g., signal 112; FIGS. 1, 2), which may subsequently be processed, stored, and/or exported by an electronics suite (e.g., electronics package 110; FIGS. 1, 2) incorporated into image capture system 100.

Figure 5:
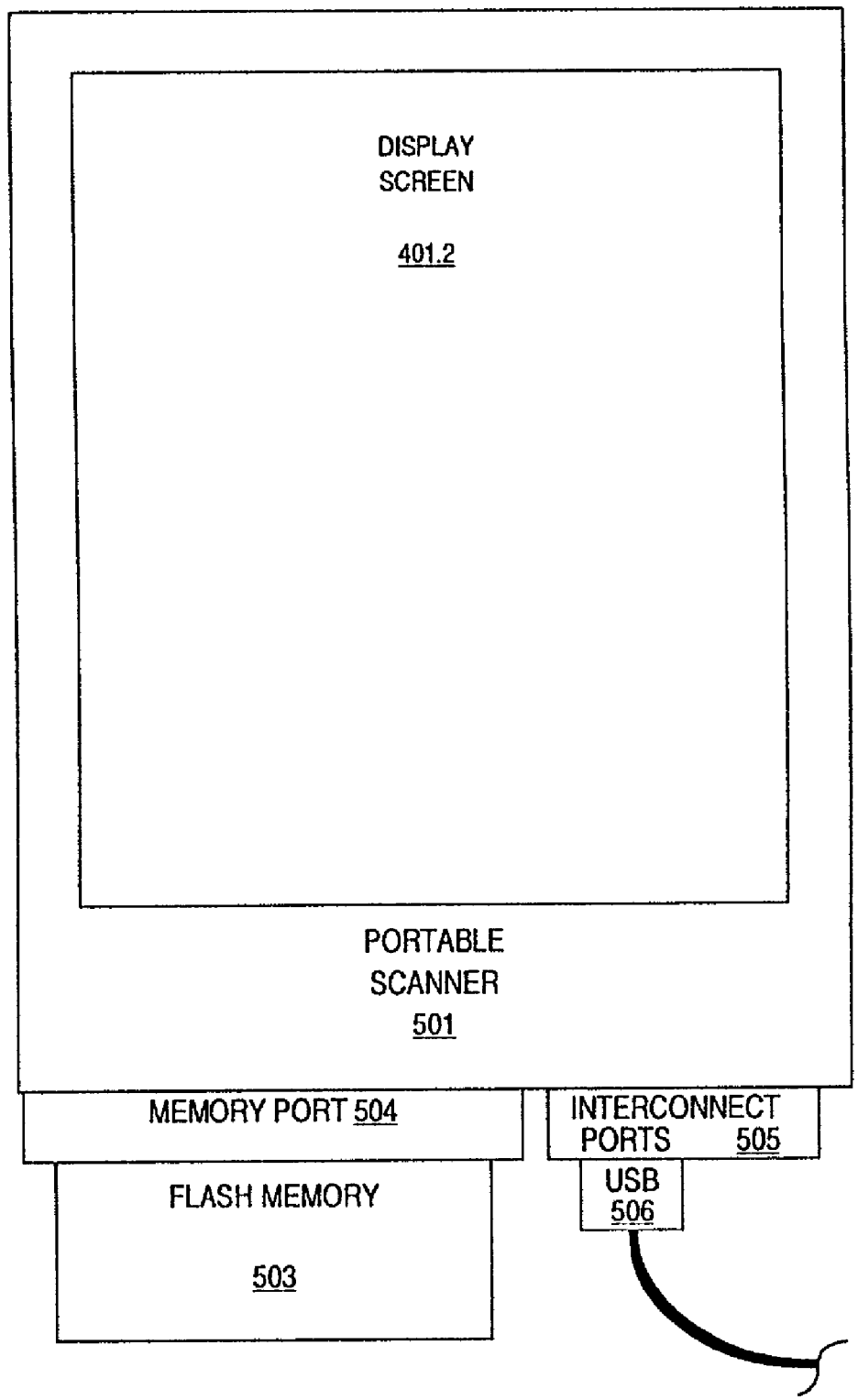
FIG. 5 is a diagram depicting the top view of a portable scanner with a screen, depicting the arrangement of components effectuating image processing, memory, and interconnections, in accordance with one embodiment of the present invention.

The signal may be processed into a photographic format such as JPEG and/or GIF, a digital video format such as DTV, and/or an analog video format such as NTSC. In one embodiment, the signal may be processed on-board. In another embodiment, the signal may simply be exported for out-board processing, such as via a USB connector coupled to an on-board USB terminal (e.g., USB 506, interconnect port 505, respectively; FIG. 5) or other data interconnection functionality. In this manner, image capture system 100 effectively gathers 3D information from real scene 366. Thus, in the present configuration, image capturing system 100 effectively functions as a digital camera and/or video camcorder.

Figure 4A:
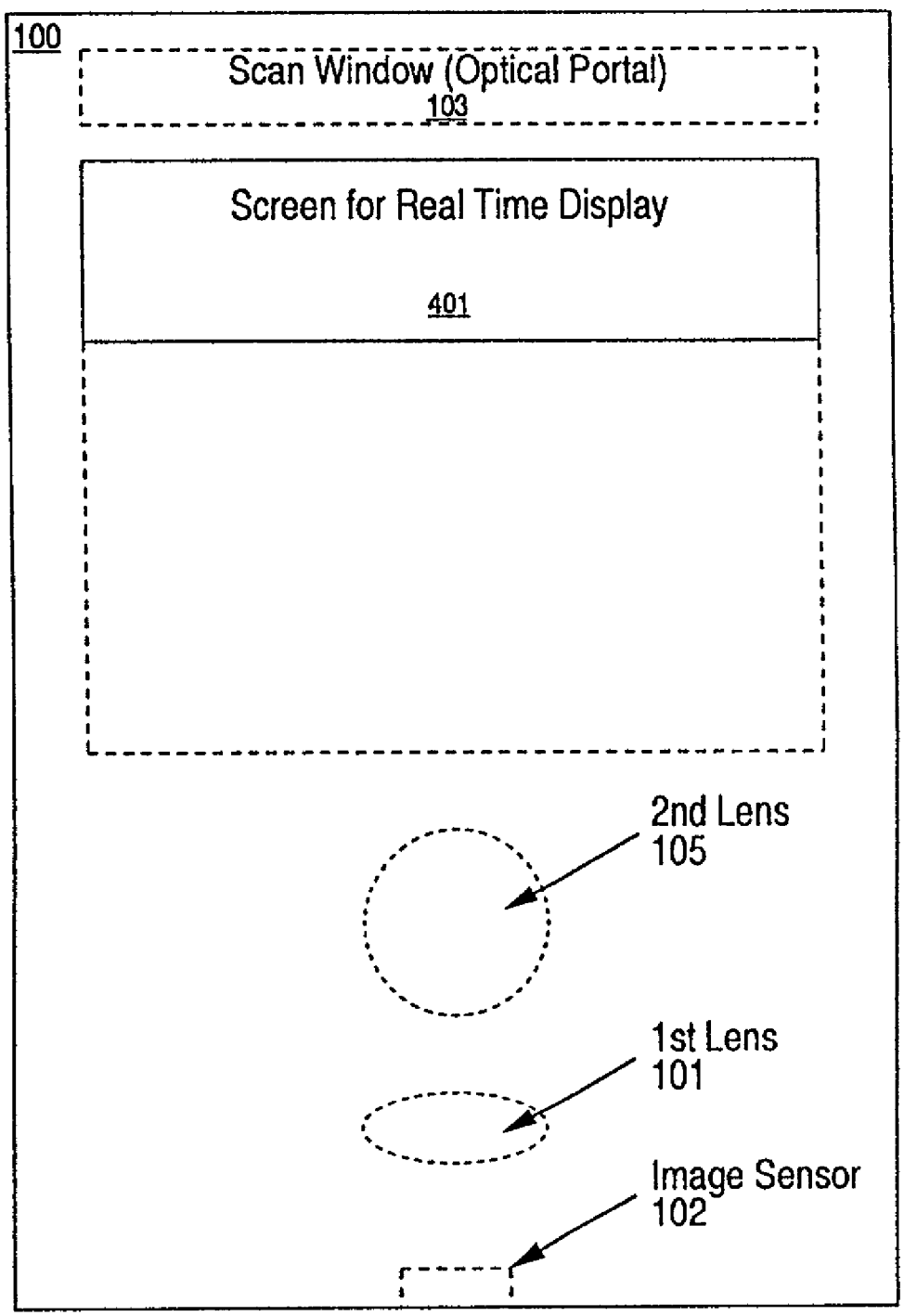
FIG. 4A is a diagram depicting the top view of a portable scanner with a screen permitting real time display of information being scanned or photographed (or videoed), and a cutaway view of an embedded dual-train optical system, in accordance with one embodiment of the present invention.

With reference to FIG. 4A, an image capturing system 100 of one embodiment is depicted from a top view. Housing 109 protects all optical, electrical, and electronic components constituting part of image capture system. A display screen 401 is mounted by housing 109 on the top surface. Display screen 401, in one embodiment, is a liquid crystal display (LCD). In one embodiment, display screen 401 is a flat panel display, such as a flat panel CRT. In another embodiment, display screen 401 is constituted by any effective display technology.

Optical portal (e.g., scan window) 103 occupies a position of the obverse of housing 109, and may be of any effective size. Objective lens 105 is mounted into the obverse of housing 109 from the top surface depicted, also. First lens 101, image sensor 102, first and second mirrors 104 and 106, respectively, and electronics package 110 are all housed securely within housing 109, internally to image capture system 100.

Figure 4B:
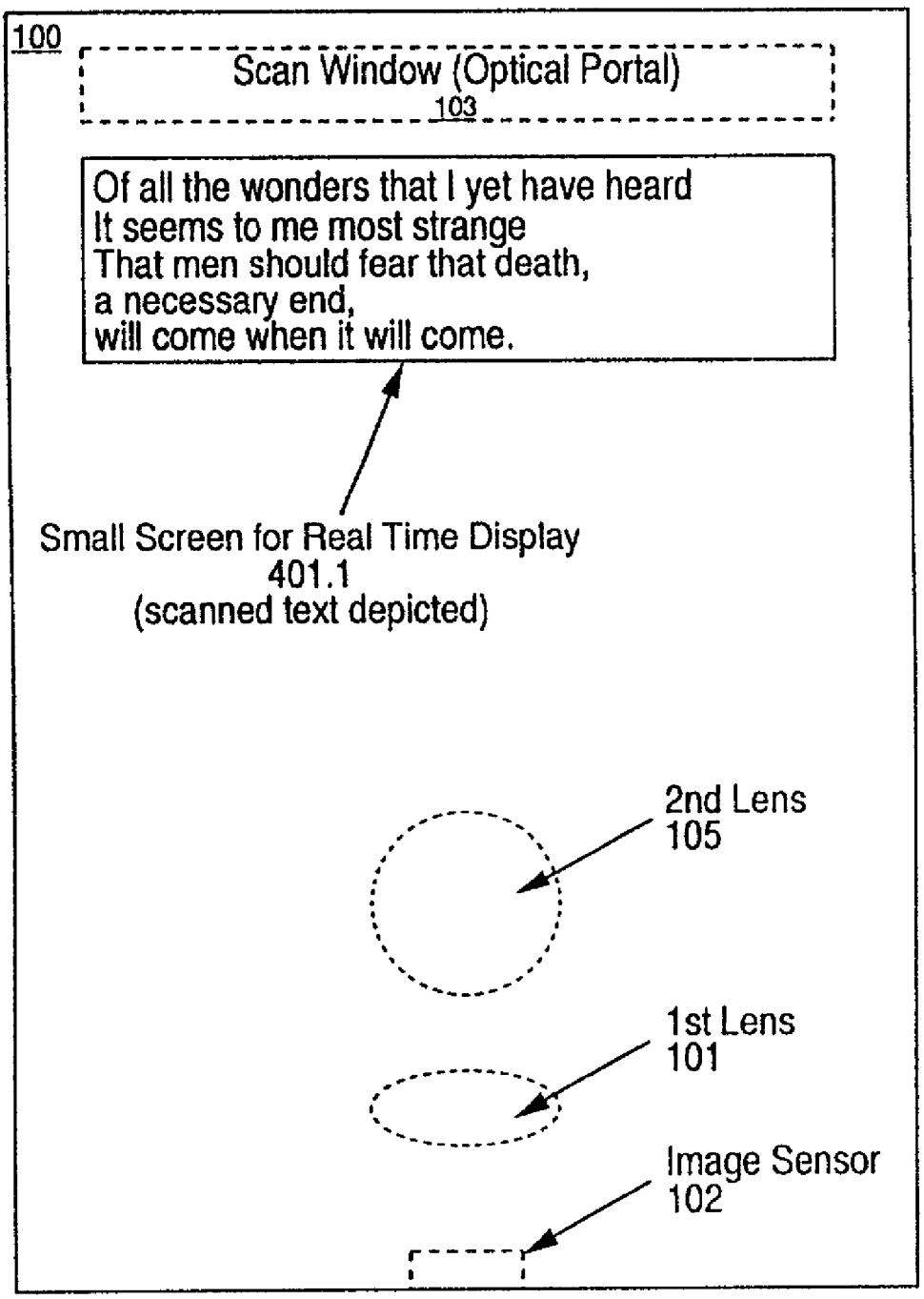
FIG. 4B is a diagram depicting the top view of a portable scanner with a small screen permitting real time limited display of information being scanned or photographed (or videoed), in accordance with one embodiment of the present invention.

In one embodiment, display screen 401 is small, occupying only a small portion of the top surface area of housing 109. Referring to FIG. 4B, a small screen 401.1 displays in real time a small segment, constituted by several lines of text, of a document being scanned by image capture system 100 in 2D scan mode. Display 401.1 may also display cropped or small images corresponding to 3D information gathered by image capture system 100 in 3D digital camera and/or video mode.

Figure 4C:
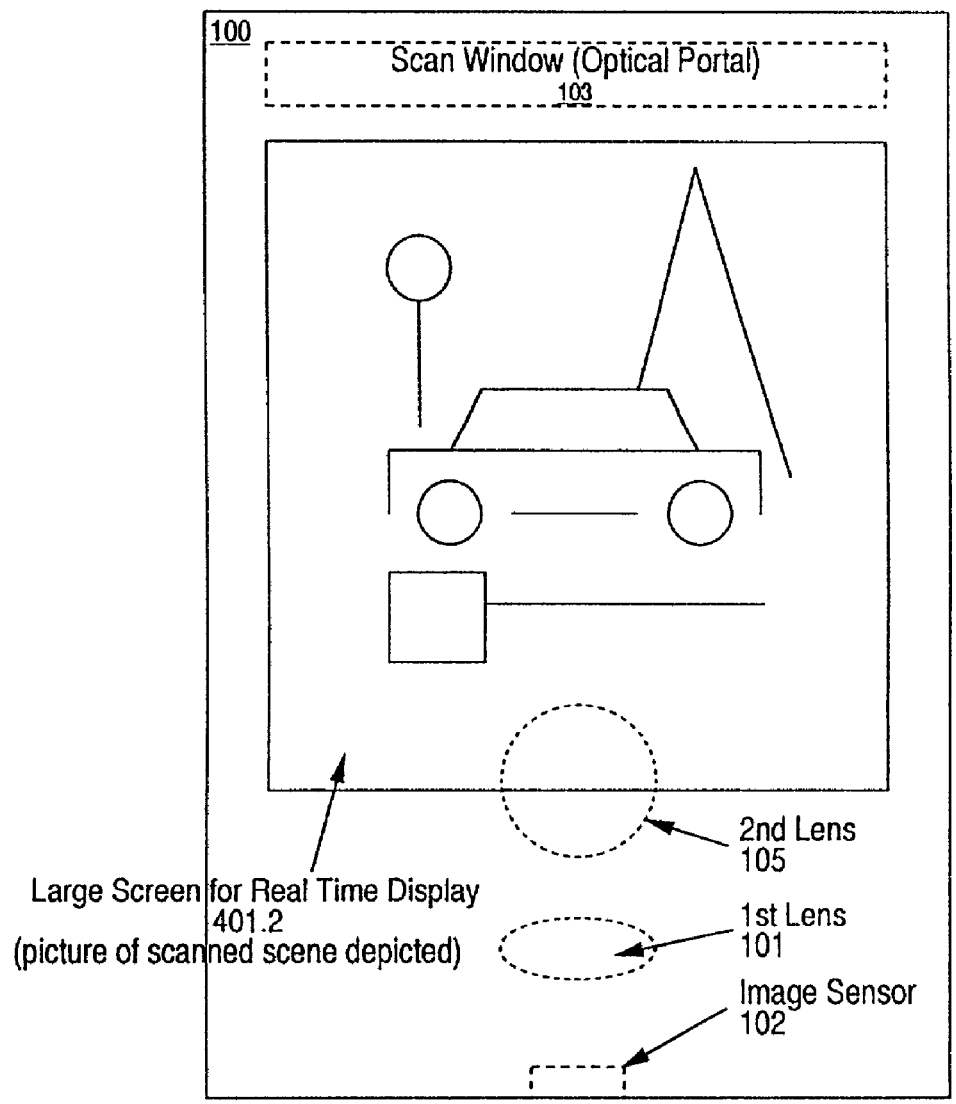
FIG. 4C is a diagram depicting the top view of a portable scanner with a large screen permitting a real time, more complete display of information being scanned or photographed (or videoed), in accordance with one embodiment of the present invention.

Display 401, in one embodiment, occupies a significantly larger area of the top surface of housing 109, and possesses concomitantly greater display capability. Referring to FIG. 4C, the display is an extended screen 401.2 of one embodiment, and displays in real time a scene representing corresponding information gathered by image capture system 100 in 3D digital camera and/or video mode. Display 401.1 may also display textual images corresponding to 2D information gathered by image capture system 100 in 2D portable scanner mode. Advantageously, in somewhat taller embodiments, the relatively larger size of display 401.2 with respect to smaller screens of another embodiment (c.f., display 401.1; FIG. 4B), effectuate the real time display of much greater portions of text being scanned by image capture system 100 in 2D portable scanner mode.

Referring to FIG. 5, an image capture system 100 of one embodiment is depicted from a top view of its housing 109, wherein a large display 401.2 is mounted. Mounted securely within a sturdy frame 109.1 constituting an edge of housing is an electrical interconnect port 505. Frame 109.1 may constitute, in various embodiments, any edge, reinforced surface, or other convenient part of housing 109.

In one embodiment, USB connector 506 electrically couples with electrical interconnect port 505, for exporting of data from image capture system 100. In another embodiment, any effective electrical interconnection modality characterizes electrical interconnect port 505 and electrical connector 506. Such connection modalities include, in various embodiments of the present invention, coaxial cable, video cable, personal computer card interface, CardBus or peripheral component interconnect (PCI) interface, mini-PCI interface, Personal Computer Memory Card International Association (PCMCIA) interface, Industry Standard Architecture (ISA) interface, or RS-232 interface.

Also mounted securely within a sturdy frame 109.1 or another convenient part of housing 109 is a memory port 504. A removable mnemonic functionality, such as a flash memory 503 in one embodiment, may be inserted and electrically accessed by an electronics functionality (e.g., electronics package 110, FIG. 2) within image capture system 100. In another embodiment, other removable data storage components, such as diskettes, memory cards, sticks, etc., may constitute removable memory 503 and be accommodated accordingly by memory port 504. Advantageously, removable memory 503 effectuates storage of data captured by image capture system 100 in either 2D scan mode, or 3D digital camera/video mode.

Exemplary Computer System

FIG. 6 is a block diagram depicting a computer subsystem 1000, constituting a processing functionality incorporated into image capture system 100 in one embodiment of the present invention. Computer system 1000 and computer usable medium 1000m effectuates on-board image processing of 2D and 3D images captured by image capture system 100, in one embodiment.

With reference to FIG. 6, computer system 1000 includes a bus 1001 for communicating information, a central processor 1050 coupled with the bus 1001 for processing information and instructions, and a memory unit 1010 (e.g., random access memory and/or read only memory) and a data storage system 1015 coupled with the bus 1001 for storing information and instructions. Data storage system 1015 may be any magnetic and/or optical disc and drive/reader, a removable storage device, such as a flash memory, memory stick, diskette, or any other data storage device.

In one embodiment of the present invention, the image processing may be executed by processor 1050, which may an application specific integrated circuit (ASIC). Alternatively, these methods may be implemented by processor 1050 executing a program stored in memory 1010 and/or data storage system 1015. It is appreciated that computer system 1000 may implement the invention by combinations of these schemes, or by alternatives other than those pictured. It is also appreciated that computer system 1000 can include other elements not shown. It is further appreciated that computer system 1000 may be constituted by any functional equivalent, or by any viable alternative architecture.

Computer system 1000 executes, in one implementation, a program embodied in a computer readable medium 1000m which may be deployed in and/or to various degrees between processor 1050 (e.g., as 1000 mP), memory 1010 (e.g., as 1000 mM), and storage unit 1015 (e.g., as 1000 mS). In the present implementation, execution of this program by computer system 1000 enables a process, which implements image processing.

In the present embodiment, system 1000 also optionally contains a display interface 1045 coupled to the bus 1001 for enabling incorporation of a display device 401. Display device 401 enables displaying information to users. In one embodiment, display interface 1045 may be a graphical user interface (GUI). In one embodiment, display interface 1045 enables a user interface. In one embodiment, aspects of display interface 1045 may be deployed within computer readable medium 1000$m$.

System 1000 may include a user alphanumeric input interface 1040 coupled to the bus 1001 for enabling incorporation of an alphanumeric or other input device 1041. Input device 1041 can communicate information and command selections to processor 1050 via input interface 1040 and bus 1001. In one embodiment, alphanumeric interface 1040 is a keyboard and/or digitizer mounted, with display 401, on an upper surface of a housing (e.g., housing 109; FIG. 4A) enclosing image capture system 100.

In one embodiment, computer system 1000 is fully integrated within an on-board electronics package (e.g., electronics package 110; FIGS. 1, 2). In one embodiment, computer system 1000 computationally supports and/or fully effectuates a navigational system (e.g., primary and secondary navigational systems 127 and 128, respectively; FIG. 2).

Exemplary Process

Figure 7:
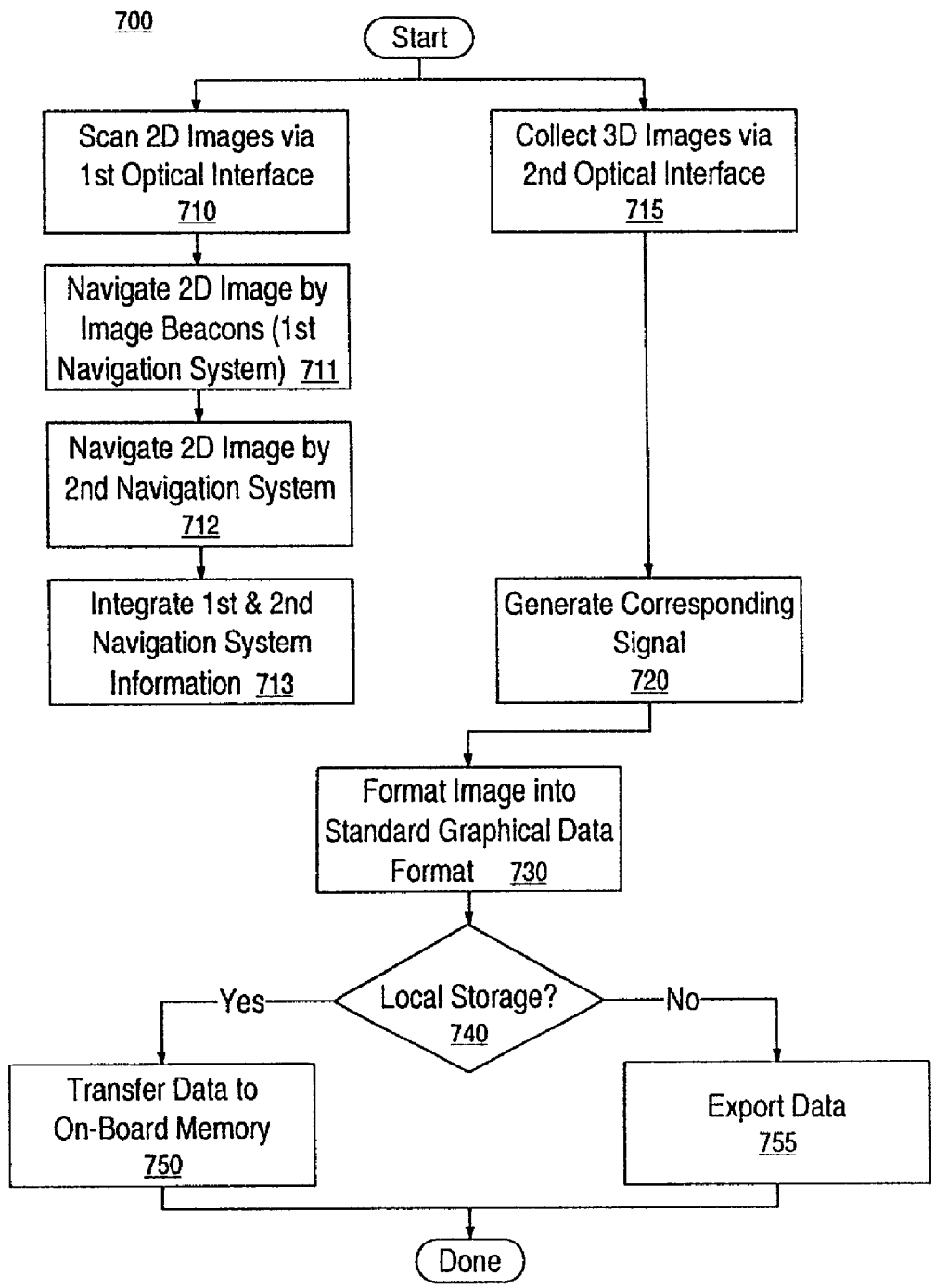
FIG. 7 is a flowchart of the steps in a process for capturing information, in accordance with one embodiment of the present invention.

With reference to FIG. 7, the steps in a process 700 enable a method for image processing, in accordance with one embodiment of the present invention.

FIG. 7 depicts flowchart 700 of steps performed in accordance with one embodiment of the present invention for image processing. Flowchart 700 includes processes of the present invention which, in one embodiment, are carried out by processors and electrical components under the control of computer readable and computer executable instructions. The computer readable and computer executable instructions reside, for example, in features such as data storage 1015, computer memory 1010 and/or registers and other structures in processor 1050 of FIG. 6. However, the computer readable and computer executable instructions may reside in any type of computer readable medium. Although specific steps are disclosed in flowchart 700, such steps are exemplary. That is, the present invention is well suited to performing various other steps or variations of the steps recited in FIG. 7.

Process 700 may begin with step 710, wherein a two dimensional (2D) image is scanned via a first optical interface (e.g., scan window 103, mirror 104, lens 101; FIGS. 2, 3B).

Alternatively, where a three dimensional image is to be captured, such as by a digital camera or video camcorder functionality, process 700 may begin with step 715. In step 715, three dimensional images are captured by a second optical interface (e.g., lens 105, two-position mirror 106 ("in" position), lens 101; FIGS. 3A, 3C).

In the instance wherein a 2D image is scanned (step 710), process 700 proceeds to navigate the 2D image using beacons derived from the 2D image, itself; step 711. Where the 2D image scanned is textual in nature, the navigation proceeds by a text-based, e.g., an ink-based navigation system, finding positional beacons amongst the printed textual information by techniques well known in the art.

Simultaneously, a secondary navigation is performed by a second navigation system; step 712. Secondary navigation, in one embodiment, is performed by an accelerometer-based navigation system, well known in the art. In another embodiment, the secondary navigation may by beacons derived from the fibers constituting the surface of the paper on which is printed the text being scanned, a technique common in the conventional art as a primary system.

The first and second navigational systems' positional information is integrated with the actual scanned 2D information, and with each other, for sharing of positional information between both navigational systems; step 713. Advantageously, this (1) enables navigation to continue when the scanner takes a swath pass over a surface whereon the printed text is interrupted, and unavailable for text-based beacons needed by the primary system, (2) allows constant feedback by both systems to each other, and (3) effectuates accurate stitching together of the text being scanned in multiple swaths of the portable scanner.

After integrating the 2D information (step 713), or if 3D images are being collected (step 715), a signal corresponding to the information derived from the images is generated; step 720.

In step 730, the signal is formatted by methods well known in the art into a standard graphical format, such as digital JPEG, GIF, MPEG, DTV, or analog NTSB. Step 702, in one embodiment, is accomplished on-board image capture system 100 by electronics (e.g., electronics package 110; FIGS. 1, 2), such as in a data processing functionality (e.g., computer sub-system 1000; FIG. 6). In another embodiment, processing is conducted off board of image capture system 100. Real time display is effectuated in embodiments with on-board display screens (e.g., displays 401, 401.1, 401.2; FIGS. 4A, 4B, 4C and 4D, respectively).

It is decided in step 740 whether the signal is to be stored locally (e.g., on-board the image capture device). If the data is to be stored locally, where it may be processed by on-board electronics (e.g., electronics package 110 and/or computer system 1000; FIGS. 2, 6). If not, the data corresponding to the signal generated is exported; step 755.

In step 750, the signal corresponding to the gathered images is transferred. Transferal, in one embodiment, is to a removable mnemonic functionality, such as a flash memory (e.g., flash memory 503; FIG. 5) or diskette. In one embodiment, transferal is accomplished by exporting as an output, the standard graphical format, such as via an electrical interconnection (e.g., interconnect port 505 and USB 506; FIG. 6) or a wireless (e.g., Bluetooth, etc.) functionality. In one embodiment, transferal is effectuated by an interconnection capability such as coaxial cable, video cable, personal computer card interface, CardBus or peripheral component interconnect (PCI) interface, mini-PCI interface, Personal Computer Memory Card International Association (PCMCIA) interface, Industry Standard Architecture (ISA) interface, or RS-232 interface. Process 700 is complete upon completion of either step 750 or step 755.

In summary, an embodiment of the present invention provides a compact, portable system for capturing both two dimensional images from printed and related media. In one embodiment, a compact, portable system for capturing both two dimensional from printed and related media, as well as three dimensional scenic images, such as photographs and/or video, also combines the optical features of scanning and photography. Further, in one embodiment, a compact, portable image capturing system is provided that is relatively simple and inexpensive, and which is easy to operate, rugged, reliable, integrating the navigational and text-gathering functionalities seamlessly, transparently, and reliably and not prone to optical misalignment, or cessation of scanning and loss of information, obviating much of the repetition of scanning efforts required by the conventional art. Further still, in one embodiment, the present invention provides a compact, portable system for capturing both two dimensional images from printed and related media, as well as three dimensional scenic images, such as photographs and/or video, while providing constant user feedback of the image quality and effectiveness, during the imaging process.

An embodiment of the present invention, a compact portable 2D/3D image capture system, is thus described. While the present invention has been described in particular embodiments, it should be appreciated that the present invention should not be construed as limited by such embodiments, but rather construed according to the following claims.

What is claimed is:

1. An apparatus for capturing images, said apparatus comprising:
    a first optical interface for scanning two dimensional graphical information;
    a first navigational mechanism coupled with said first optical interface, wherein said first navigational mechanism is text based;
    a second navigational mechanism that is functionally integrated with said first navigational mechanism;
    a second optical interface for collecting three dimensional information; and
    an image sensor optically coupled to said first optical interface and said second optical interface, said image sensor for generating a signal corresponding to said two dimensional graphical information and said three dimensional information.

2. The apparatus as recited in claim 1, further comprising:
    a repository electrically coupled to said image sensor that stores said signal corresponding to said two dimensional graphical information and said three dimensional information.

3. The apparatus as recited in claim 1, further comprising:
    an image processor electrically coupled to said image sensor that processes said signal corresponding to said two dimensional graphical information and said three dimensional information.

4. The apparatus as recited in claim 1, further comprising:
    an information transfer mechanism electrically coupled to said image sensor that transfers said signal corresponding to said two dimensional graphical information and said three dimensional information.

5. The apparatus as recited in claim 1, further comprising a display device electrically coupled with said image sensor that displays an image corresponding to said two dimensional graphical information and said three dimensional information, wherein said image is displayed in real time, with respect to said scanning and said gathering.

6. The apparatus as recited in claim 1, wherein said second navigational mechanism is selected from the group consisting of accelerometers and mechanical navigation devices.

7. The apparatus as recited in claim 1, wherein said first optical interface comprises a first lens and a device for articulating the longitudinal axis of a first path of light comprising reflections from said two dimensional graphical information at substantially a right angle, said device for articulating comprising, selectively, a mirror and a prism, said first lens focusing said first path of light upon said optical image sensor.

8. The apparatus as recited in claim 1, wherein said second optical interface comprises said first lens, a second lens and a mirror, said mirror having a first position and a second position, said first position effectively disrupting said second optical interface and said second position optically coupling said first lens and said second lens by articulating the longitudinal axis of a second path of light comprising reflections from said three dimensional information at substantially a right angle, said second optical interface focusing said second path of light upon said optical image sensor.

9. The apparatus as recited in claim 1, wherein said image sensor is selected from the group consisting of charge coupled devices and contact image sensors, VGA sensors, and optically sensitive solid state devices.

10. The apparatus as recited in claim 1, wherein said signal corresponding to said two dimensional graphical information and said three dimensional information is, selectively, processed entirely on board said apparatus and exported.

11. The apparatus as recited in claim 1, wherein said apparatus is portable.

12. A method for capturing images comprising: scanning two dimensional graphical information via a first optical interface, wherein said scanning comprises navigating said two dimensional information with a first navigational mechanism coupled to said first optical interface wherein said first navigational mechanism is based on said two dimensional information and wherein a second navigational mechanism augments said first navigational system and is functionally integrated therewith;
    collecting three dimensional information via a second optical interface; and
    generating a signal corresponding to two dimensional graphical information and said three dimensional information in an image sensor optically coupled to said first optical interface and said second optical interface.

13. The method as recited in claim 12, wherein said first optical interface comprises a first lens and a device for articulating the longitudinal axis of a first path of light comprising reflections from said two dimensional graphical information at substantially a right angle, said device for articulating comprising, selectively, a mirror and a prism, said first lens focusing said first path of light upon said optical image sensor.

14. The method as recited in claim 12, wherein said second optical interface comprises said first lens, a second lens and a mirror, said mirror having a first position and a second position, said first position effectively disrupting said second optical interface and said second position optically coupling said first lens and said second lens by articulating the longitudinal axis of a second path of light comprising reflections from said three dimensional information at substantially a right angle, said second optical interface focusing said second path of light upon said optical image sensor.

15. The method as recited in claim 12, wherein said image sensor is selected from the group consisting of charge coupled devices, contact image sensors, VGA sensors, and optically sensitive solid state devices.

16. The method as recited in claim 12, wherein said second navigational mechanism is selected from the group consisting of accelerometers and mechanical navigation devices.

17. The method as recited in claim 12, further comprising storing said signal.

18. The method as recited in claim 12, further comprising formatting said two dimensional information and said three dimensional information into a standard graphics format.

* * * * *